UNITED STATES PATENT OFFICE.

ELTON R. DARLING, OF MONTCLAIR, NEW JERSEY, ASSIGNOR TO ELLIS-FOSTER COMPANY, A CORPORATION OF NEW JERSEY.

MAKING BISMUTH OXID.

1,354,806.  Specification of Letters Patent.  Patented Oct. 5, 1920.

No Drawing.  Application filed January 4, 1919. Serial No. 269,666.

*To all whom it may concern:*

Be it known that I, ELTON R. DARLING, a citizen of the United States, residing at Montclair, in the county of Essex and State of New Jersey, have invented certain new and useful Improvements in Making Bismuth Oxid, of which the following is a specification.

This invention relates to a method of making bismuth oxid and relates particularly to a process involving the production of the oxid direct from the metal by means of an oxidizing agent as will be hereinafter described.

Bismuth is a difficult metal to oxidize to produce lower oxids cheaply. By the present process it is possible to make an oxid such as $Bi_2O_3$ by fusion with an oxidizing agent as for example sodium nitrate or Chile saltpeter. The reaction takes place comparatively slowly between these two substances but may be greatly facilitated by the introduction of chlorin gas. For example on heating 1 part of bismuth with 1½ parts sodium nitrate to a temperature of 350° the rate of oxidation was very slow but upon the introduction of chlorin gas the reaction began to take place rapidly and brown fumes of oxids of nitrogen appeared. The bismuth was rapidly converted into the yellow oxid which could be separated easily from sodium nitrate or nitrite and other salts by washing. The metal was completely converted in this manner to the yellow oxid.

The foregoing example is merely an illustration of my process and I may vary the oxidation by the use of other oxidizing agents and different temperatures. I find, however, that sodium nitrate which fuses readily, at somewhat above 300° C. reacts effectively with bismuth which is molten under these conditions in the presence of a stream of chlorin gas. The rate of the reaction may in fact be quite easily regulated by the rate at which the chlorin gas passes through the solution. However, I do not limit myself to the use of chlorin gas or any other accelerator of the reaction but may bring about the reaction between bismuth and sodium nitrate or other fusible oxidizing agent at higher temperatures. With the sodium nitrate the yellow oxid of bismuth is obtained in a state of considerable purity and at a comparatively low cost.

It is also possible to add to the sodium nitrate other oxidizing agents such as peroxid, sodium chlorate and the like or to use the latter without the sodium nitrate or to use potassium nitrate. When the nitrates of sodium or potassium are used under conditions which give rise to the formation of nitrites these may be recovered from the melt.

What I claim is:—

1. The process of making yellow bismuth oxid which comprises fusing metallic bismuth with sodium nitrate and passing chlorin gas into the fused material.

2. The process of producing an oxid of bismuth which comprises reacting on molten bismuth with molten sodium nitrate.

3. The process of making a lower oxid of bismuth which comprises reacting on molten bismuth with molten sodium nitrate in the presence of an accelerator of the reaction.

4. The process of making yellow oxid of bismuth which comprises reacting on material containing metallic bismuth with fused sodium nitrate and chlorin gas.

5. The process of making an oxid of bismuth which comprises reacting on material consisting substantially of bismuth with a molten oxidizing agent and chlorin gas.

6. The process of making an oxid of bismuth which comprises reacting on the molten metal with a molten oxidizing agent in the presence of an accelerator of oxidation.

ELTON R. DARLING.